(12) United States Patent
Gulli

(10) Patent No.: US 8,992,092 B2
(45) Date of Patent: Mar. 31, 2015

(54) FLANGED BEARING RING FOR THE HUB OF A MOTOR VEHICLE WHEEL

(71) Applicant: Aktiebolaget SKF, Gothenburg (SE)

(72) Inventor: Carmelo Gulli, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/100,609

(22) Filed: Dec. 9, 2013

(65) Prior Publication Data

US 2014/0161382 A1 Jun. 12, 2014

(30) Foreign Application Priority Data

Dec. 7, 2012 (IT) ................ TO2012A1056

(51) Int. Cl.
| | |
|---|---|
| *F16C 19/08* | (2006.01) |
| *B21D 53/10* | (2006.01) |
| *B60B 27/00* | (2006.01) |
| *F16C 13/02* | (2006.01) |
| *F16C 33/58* | (2006.01) |
| *B60B 3/16* | (2006.01) |
| *F16B 37/12* | (2006.01) |
| *F16C 33/60* | (2006.01) |
| *F16C 19/18* | (2006.01) |

(52) U.S. Cl.
CPC ............... *F16C 33/586* (2013.01); *B60B 3/16* (2013.01); *F16B 37/122* (2013.01); *F16C 33/60* (2013.01); *B60B 27/0094* (2013.01); *F16C 19/186* (2013.01)
USPC ........... 384/544; 384/515; 384/569; 384/589; 301/105.1

(58) Field of Classification Search
CPC . F16C 19/181; F16C 33/586; B60B 27/0094; B60B 3/145; B60B 3/165; F16B 37/122
USPC .............. 384/515, 544, 569, 589; 301/105.1, 301/114, 122
See application file for complete search history.

(56) References Cited

U.S. PATENT DOCUMENTS

| | | | | |
|---|---|---|---|---|
| 3,156,281 | A * | 11/1964 | Demi ............................ | 411/147 |
| 3,583,511 | A * | 6/1971 | Asberg .......................... | 384/544 |
| 5,079,825 | A * | 1/1992 | Matsui et al. .................... | 29/520 |
| 7,070,401 | B2 * | 7/2006 | Clendenin et al. ............ | 418/55.5 |
| 7,185,873 | B2 * | 3/2007 | Suka et al. ..................... | 411/544 |
| 7,425,144 | B2 * | 9/2008 | Bader et al. .................... | 439/210 |
| 7,779,801 | B2 * | 8/2010 | Kleiber et al. .............. | 123/90.17 |
| 7,798,111 | B2 * | 9/2010 | Kleiber et al. .............. | 123/90.15 |
| 8,047,722 | B2 * | 11/2011 | Shigeoka et al. ............. | 384/544 |

(Continued)

FOREIGN PATENT DOCUMENTS

| | | | | |
|---|---|---|---|---|
| DE | 19746167 | A1 | 4/1999 | |
| DE | 10246939 | A1 * | 5/2004 | ............. F16D 65/12 |

(Continued)

*Primary Examiner* — Marcus Charles
(74) *Attorney, Agent, or Firm* — Bryan Peckjian; SKF USA Inc. Patent Dept.

(57) ABSTRACT

A flanged bearing ring has a tubular core of steel and an outer flange of a light metal in which there are formed axial through bores for accommodating bolts for mounting a wheel to the ring; fixed in each bore is a steel insert which forms a threaded inner cylindrical cavity extending between two opposite faces of the flange, and one or two transverse shoulders which are in contact with the material of the flange so as to oppose relative axial movements of the steel insert with respect to the flange.

11 Claims, 3 Drawing Sheets

(56) References Cited

U.S. PATENT DOCUMENTS

| | | | |
|---|---|---|---|
| 2011/0235957 A1 | 9/2011 | Vissers et al. | |
| 2011/0281133 A1 | 11/2011 | Moessinger et al. | |
| 2012/0055587 A1* | 3/2012 | Vissers et al. | 148/516 |
| 2012/0161501 A1 | 6/2012 | Knopf et al. | |
| 2012/0248857 A1* | 10/2012 | Re et al. | 301/109 |

FOREIGN PATENT DOCUMENTS

| | | | | | |
|---|---|---|---|---|---|
| EP | 2468528 A1 | | 6/2012 | | |
| JP | 10129205 A | * | 5/1998 | | F16C 33/78 |
| JP | 2002187404 A | * | 7/2002 | | B60B 3/16 |
| JP | 2002347402 A | * | 12/2002 | | B60B 3/16 |
| JP | 2006007791 A | * | 1/2006 | | |
| JP | 2008279861 A | * | 11/2008 | | F16C 19/18 |
| JP | 2010167846 A | * | 8/2010 | | |
| WO | WO 2004035326 A1 | * | 4/2004 | | B60B 27/00 |
| WO | 2008147284 A1 | | 12/2008 | | |
| WO | WO 2008147284 A1 | * | 12/2008 | | B22D 19/04 |
| WO | WO 2010021118 A1 | * | 2/2010 | | B60B 27/00 |
| WO | WO 2010047097 A1 | * | 4/2010 | | F16C 19/18 |
| WO | WO 2010063299 A1 | * | 6/2010 | | F16C 19/18 |

\* cited by examiner

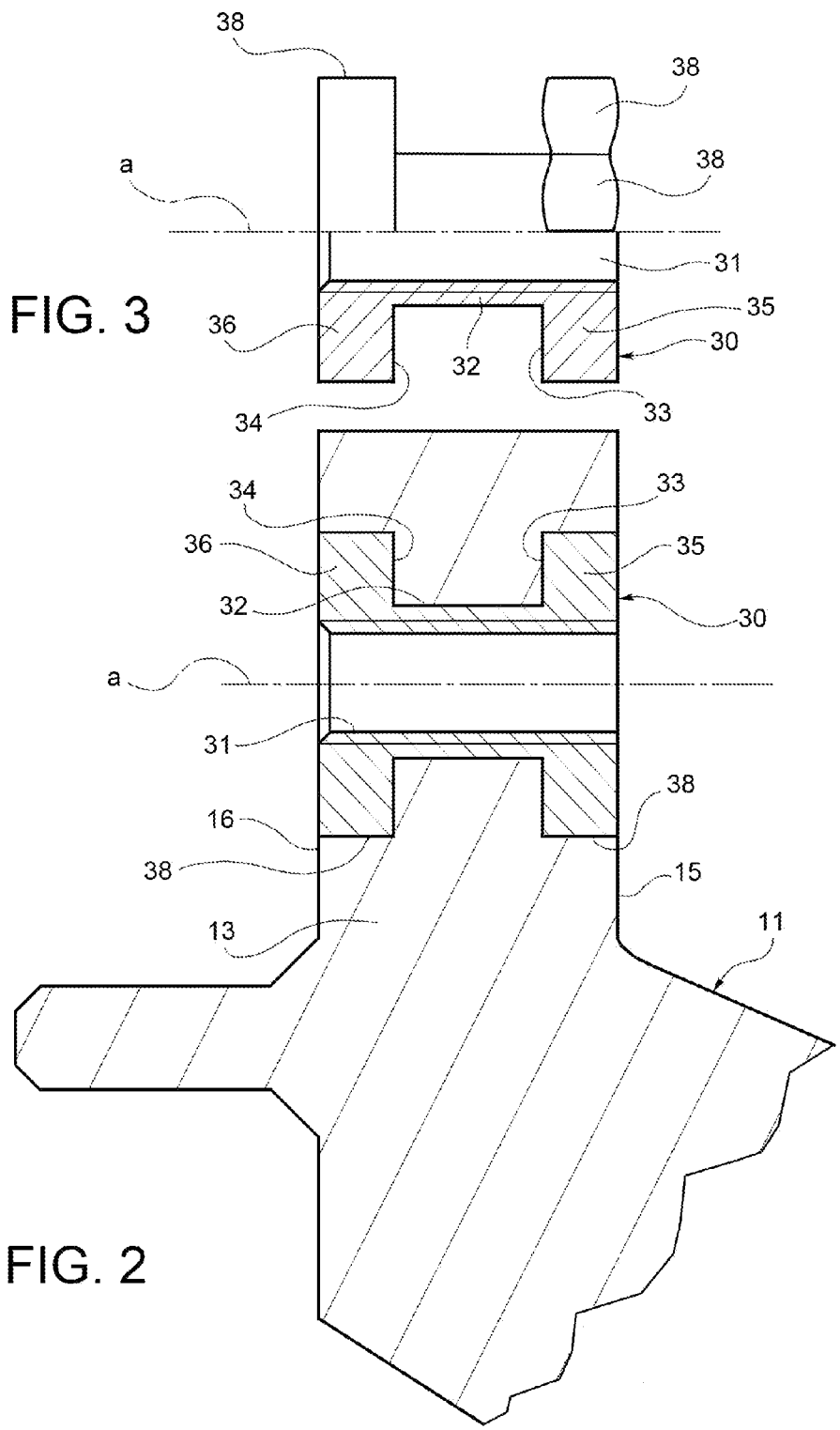

FLANGED BEARING RING FOR THE HUB OF A MOTOR VEHICLE WHEEL

CROSS-REFERENCE TO RELATED APPLICATIONS

This application claims priority to Italian Patent Application No. TO2012A001056 filed Dec. 7, 2012, the content of which is herein fully incorporated by reference.

FIELD OF THE INVENTION

The present invention relates to a lightweight flanged bearing ring for the hub of a motor vehicle wheel.

BACKGROUND OF THE INVENTION

For the mounting of a wheel on the hub of a motor vehicle bolted connections are conventionally used. Heretofore, the most common way to secure the wheel to the radial flange of the hub is to provide conventional threaded bores in the radial flange of the hub and through bores formed in the wheel. The wheel, a flange of the brake rotor and the radial flange of the hub are brought axially close to one another and a set of bolts are fitted into the aligned bores of these three elements. The bolts are screwed and tightened in the threaded bores of the hub.

The motorcar industry is facing an ever increasing demand for weight reduction in motor vehicle components for the sake of cutting down fuel consumption and exhaust emissions. In order to reduce the overall weight of the wheel and, in particular of the rotating mass, the hub flange may be partially made of a lighter material than the steel constituting the central part or tubular core of the hub. Typically, the flange can be made of light metal alloys (such as aluminum, titanium, magnesium), metal matrix composites, polymers, fiber reinforced polymers. The core of the hub is made of a high toughness metallic material, such as a bearing grade steel or a steel with a low carbon content. The coupling between the core of the hub and the lighter flange is made alternatively by interference form coupling with, or by overmolding.

Patent publication WO 2008/147284 A1 discloses a bearing ring composed of two different materials joined together as a single piece, namely a first high toughness material, such as a bearing grade steel, which form the raceways, and a second light material, such as a light metal, which forms the remaining part of the ring, including an outer flange for mounting the wheel.

It is known that the aforesaid light materials generally have a lower mechanical strength than that of steel which is used conventionally.

The mounting of the wheel connecting bolts in bores formed directly through a light metal or light metal alloy flange involves a high concentration of stress, which is inadmissible on surfaces of reduced area of a metallic material having a hardness which is much less than that of steel. Because of this, there is the risk that the bolts may gain some play within the bores of the flange and become free to rotate and/or perform undesirable axial displacements.

An object of the invention is to provide a steady threaded connection for the wheel mounting bolts, in a flanged ring of the aforementioned type, having a lightweight metal flange for mounting a motor vehicle wheel.

BRIEF DESCRIPTION OF THE DRAWINGS

A few preferred but not limiting embodiments of the invention will now be described with reference to the accompanying drawings, in which:

FIG. 2 is a partial cross-sectional view, to an enlarged scale, of a flanged ring of FIG. 1 with an insert incorporated therein;

FIG. 3 is a view in partial axial cross-section of the insert of FIG. 2; and

DETAILED DESCRIPTION OF THE INVENTION

Figure 1:
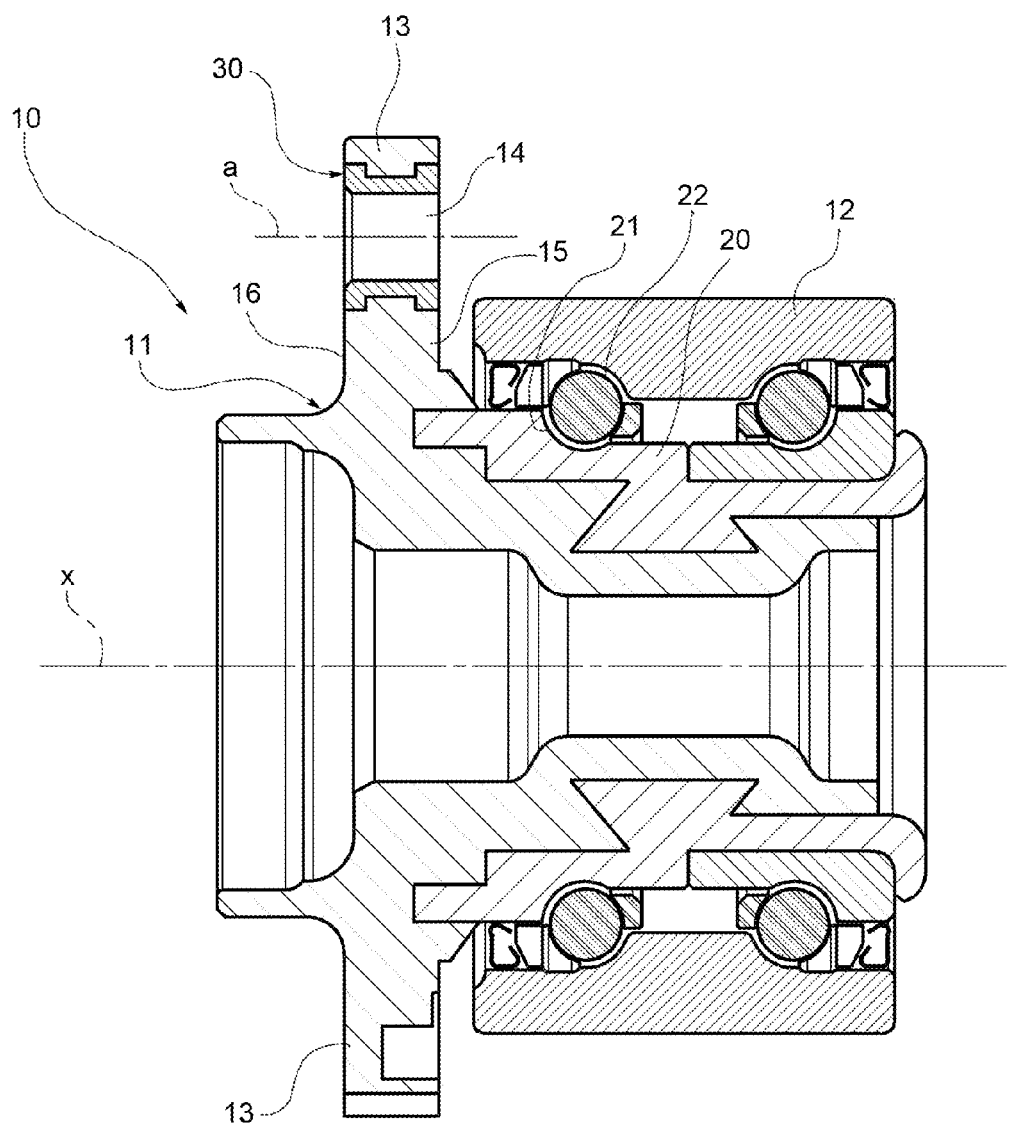
FIG. 1 is a partial axial cross-sectional view of a flanged ring which is part of a hub bearing unit for a motor vehicle wheel.

Referring initially to FIG. 1, numeral 11 designates a flanged ring forming part of a hub-bearing unit 10 adapted to rotatably mount a motor vehicle wheel about an axis of rotation x. The hub-bearing unit also includes a stationary outer ring 12, which in use is connected to a suspension standard (not shown).

For the connection to the wheel, the ring 11 comprises a flange 13 which extends in a radially outer direction. A plurality of axial parallel through bores 14 are formed through the flange at positions angularly equally spaced around the axis x. The bores 14 are adapted to partially accommodate a corresponding plurality of wheel mounting bolts (not shown). The bores 14 extend through the flange 13 between an axially inner radial face 15, intended in use to be facing the vehicle, and an axially outer radial face 16, providing a flat supporting surface for a brake rotor (not shown) and/or a wheel (not shown) of the vehicle. Each bore 14 defines a respective axis A parallel to the axis of rotation x.

Throughout the present description and claims, the terms and expressions indicating positions and directions such as "radial" and "axial" shall be construed as referring to the axis of rotation x. Expressions such as "axially inner" (or "inboard") and "axially outer" (or "outboard") refer to a condition mounted on the vehicle.

The flange 13 is made, at least in part, of a material here defined as "light", which is preferably selected from the following: light metallic alloys (for example aluminum, titanium, magnesium), metal matrix composites, polymers, reinforced polymer fibers.

The flanged ring 11 comprises a substantially tubular core 20, which is made of a high toughness metallic material such as steel, preferably a bearing grade steel or a steel with a low carbon content. The core 20 forms at least one raceway 21 for a set of rolling elements 22, in this example balls, interposed between the core 20 of the flanged ring 11 and the outer ring 12 of the bearing.

The flange 13 is connected integrally and rigidly to the core 20 as a single piece, according to coupling technologies that are per se known in the art and therefore will not be discussed herein. Suffice it to mention the fact that the part of lightweight material forming the flange 13 is coupled to the core 20 preferably by overmolding or casting, or by form coupling with radial interference.

To compensate for the lower mechanical resistance of the lightweight material of which the flange 13 is made, in each of the bores 14 a respective steel insert 30 is fixed. The insert 30 is incorporated in the flange 13 and has an inner threaded cylindrical cavity 31. The threaded cavity 31 extends between the axially inner radial face 15 and the axially outer radial face 16 of the flange, and provides a threaded surface into which a respective wheel mounting bolt (not shown) is subsequently introduced and screwed. The ends of the threaded shanks of such bolts protrude partially from the axially outer face of the flange 16 (or outboard side), according to a known arrangement.

Each insert 30 has a sleeve portion 32, which internally forms the cavity 31, and externally has at least one surface 33 which extends transversely with respect to the x axis and is in contact with the material of the flange 13 so as to oppose relative axial movements between the steel insert and the rest of the flanged ring 11.

Preferably, each insert 30 provides two surfaces 33, 34 facing in opposite axial directions, which extend transversely with respect to the axis x and are both in contact with the material of the flange 13 so as to oppose relative axial movements between the steel insert and the rest of the flanged ring 11. In the embodiment of FIGS. 1, 2 and 3, the two transversal surfaces 33 and 34 are provided by two axially spaced shoulders 35, 36, in this example two end shoulders that extend from respective opposite axial ends of the sleeve portion 32. In this embodiment, the transversal surfaces 33 and 34 are axially facing one another.

Figure 4:
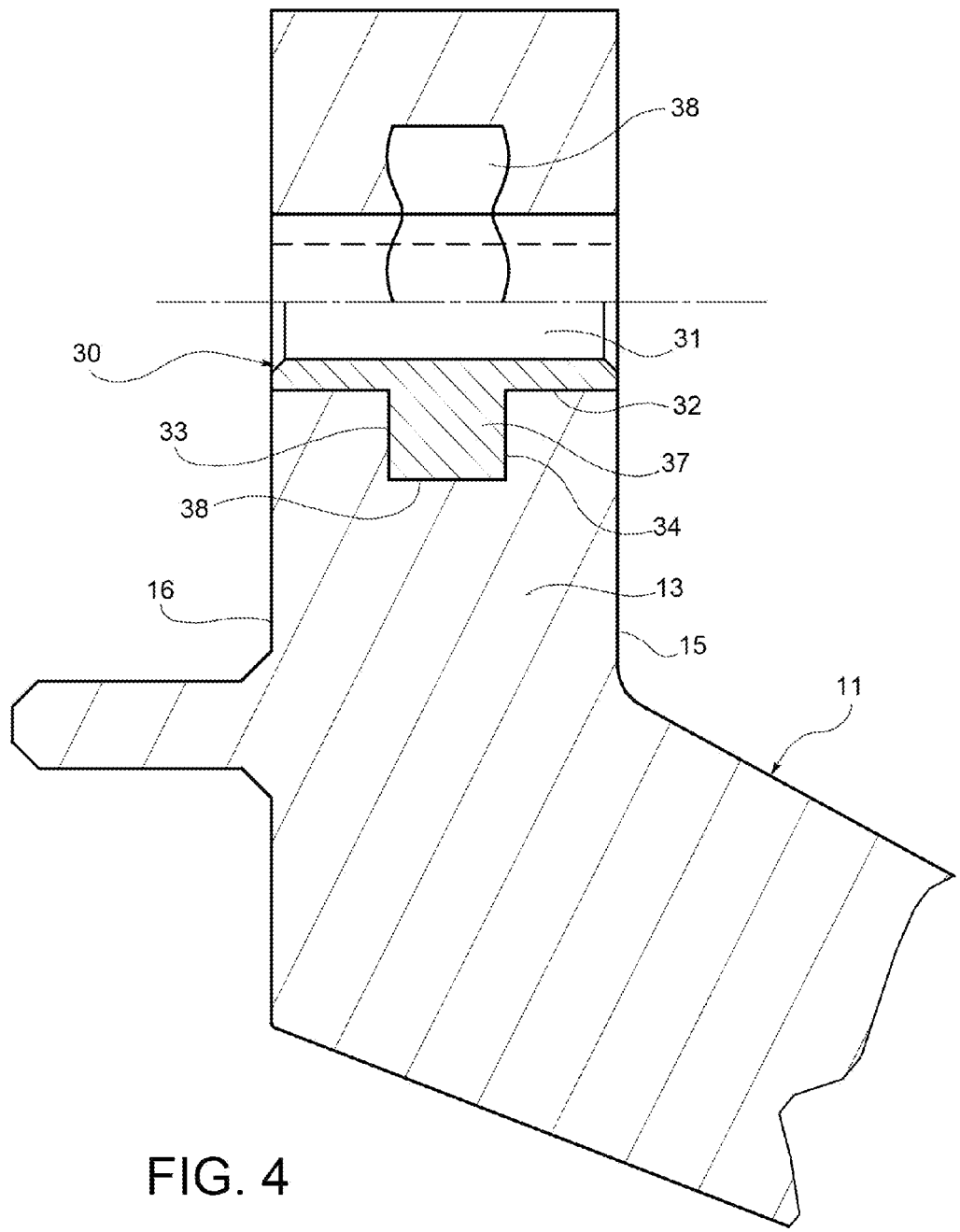
FIG. 4 is a schematic view, in partial cross-section, of a flange with an incorporated having a different shape.

In the embodiment of FIG. 4, the two transversal surfaces 33 and 34 are provided by a single intermediate shoulder 37 that extends from a median area of the sleeve portion 32. In this embodiment, the transversal surfaces 33 and 34 are facing opposite axial directions.

Preferably, in all embodiments, each insert 30 provides one or more anti-rotation outer surfaces 38, arranged in contact with the material of the flange 13, to prevent rotational movement of the insert about the axis of the respective bore 14. These rotational movements should be opposed especially upon screwing and tightening the wheel mounting bolts. The anti-rotation surfaces 38 are surfaces having a shape different from that of a surface of revolution around the axis A of the respective bore 14. In the examples illustrated herein, the anti-rotation surfaces 38 are represented as prismatic surfaces, but it is to be understood that they may take many different shapes from that illustrated, for example a splined shape, or even different shapes (for example with a flat lying in the plane of a chord), or with one or more radial projections, on condition that the shapes provide surfaces with zones being radially differently spaced with respect to the axis A of the bore 14. In order to further enhance the anti-rotation effect, and increase the torque that opposes the rotational movements of the inserts about the respective axes A of the bores, the anti-rotation surfaces may be made also on peripheral areas of the shoulders 35, 36, 37. According to a non-illustrated embodiment, the anti-rotation surfaces may also be made on the outside of the sleeve portion 32 or only on this, depending on the degree of anchoring the inserts are required to have.

In accordance with a non-illustrated embodiment, the insert 30 may provide one shoulder, similar to one of the shoulders 35 or 36 of FIG. 2, which extends from one of the two opposite axial ends of the sleeve portion 32. In such an embodiment, the insert provides a single transverse surface 33 or 34 to oppose axial movement of the insert relative to the flange 13.

The inserts 30 may be embedded in the flange 13 by placing them in a mold prior to the casting or molding step in which the flange 13 and the other parts of the ring made of lightweight material are formed.

As will be appreciated, the arrangements described herein above allow to securely connect a ring of hub-bearing unit having a flange of lightweight material to a wheel. The inserts optimize the stress distribution within the flange, since they prevent stress concentration in the lightweight material which the flange is made of. The wheel mounting bolts engage threads made in steel inserts. The shoulders and the anti-rotation surfaces hold the inserts still with respect to the flange, in particular during the steps of tightening and loosening the bolts. No specific processing of the flange is required.

While exemplary embodiments have been disclosed in the foregoing detailed description, it should be noted that a vast number of variations exist. It should also be noted that the exemplary embodiment or exemplary embodiments are only illustrative examples, and are not intended to limit the scope, applicability, or configuration in any way. Rather, the drawings and detailed description will provide those skilled in the art with a convenient guide for implementing at least one exemplary embodiment, it being understood that various changes may be made in the function and arrangement of elements described in the exemplary embodiments, without departing from the scope as set forth in the appended claims and their legal equivalents.

The invention claimed is:

1. A flanged bearing ring for a motor vehicle wheel, the flanged bearing ring defining a central axis of rotation and comprising:
   a tubular core made of a first material comprised of a high toughness metal;
   a flange extending in a radially outer direction and comprised of a second material lighter than the first material, the flange being integral with the tubular core and having a plurality of axial through bores at positions equally angularly spaced from one another around the central axis of rotation, each of the axial through bores defining a respective axis parallel to the central axis of rotation;
   a plurality of steel inserts, each being fixed in one of the axial through bores and providing a threaded inner cylindrical cavity extending between an axially inner radial face of the flange and an axially outer radial face of the flange; and
   at least one first transversal outer surface extending transversely with respect to the central axis of rotation and in contact with the second material of the flange so as to counter relative axial movements of the plurality of steel inserts with respect to the flange.

2. The flanged bearing ring according to claim 1, wherein each of the plurality of steel inserts further provides a second transversal outer surface which extends transversely with respect to the central axis of rotation, is facing an axial direction opposite to an axial direction faced by the first transversal outer surface, and is in contact with the second material of the flange so as to counter relative axial movements of the plurality of steel inserts relative to the flange.

3. The flanged bearing ring according to claim 2, wherein each of the plurality of steel inserts has a sleeve portion which forms the internal threaded cavity, and at least one first shoulder which extends outwardly from the sleeve portion and provides the at least one first transversal outer surface.

4. The flanged bearing ring according to claim 3, wherein the at least one first shoulder extends from an area of the sleeve portion located in an intermediate position between the axially inner and outer radial faces of the flange, and provides the first and second transversal outer surfaces located on opposite axial sides of the same at least one first shoulder and facing opposite axial directions from one another.

5. The flanged bearing ring according to claim 3, wherein each of the plurality of steel inserts provides the at least one first shoulder with the first transversal outer surface, and a second shoulder which extends outwardly from the sleeve portion and provides the second transversal outer surface which is facing axially from the first transversal outer surface.

6. The flanged bearing ring according to claim 5, wherein the at least one first shoulder and the second shoulder are axially spaced from one another and extend from respective opposite axial ends of the sleeve portion.

7. The flanged bearing ring according to claim 6, wherein each of the plurality of steel inserts has at least one outer anti-rotation surface which is arranged in contact with the second material of the flange for preventing rotational movements of the plurality of steel inserts about the axis of the respective bore.

8. The flanged bearing ring according to claim 7, wherein each of the outer anti-rotation surfaces provides a surface radially spaced a different distant from the axis of the respective bore.

9. The flanged bearing ring according to claim 8, wherein each of the outer anti-rotation surfaces further comprises a surface having a shape different from that of a surface of revolution about the axis of the respective bore.

10. The flanged bearing ring according to claim 9, wherein the outer anti-rotation surfaces are provided on peripheral zones of at least one of the at least one first shoulders and the second shoulder.

11. The flanged bearing ring according to claim 10, wherein the first material of the tubular core includes at least one of a bearing grade steel and a steel having a low carbon content, and
   wherein the second material of the flange is selected from the following: aluminum or aluminum alloys, titanium alloys, magnesium alloys, metal matrix composites, polymers, fiber reinforced polymers.

\* \* \* \* \*